United States Patent [19]

Ishii

[11] Patent Number: 5,596,560

[45] Date of Patent: Jan. 21, 1997

[54] DATA PLAYBACK DEVICE WITH VERIFICATION OF DATA OUTPUT BY CALCULATING DEVICE

[75] Inventor: Hiroshi Ishii, Tokyo, Japan

[73] Assignee: Clarion Co., Ltd., Saitame-ken, Japan

[21] Appl. No.: 477,325

[22] Filed: Jun. 7, 1995

[30] Foreign Application Priority Data

Jun. 16, 1994 [JP] Japan .................................. 6-156396

[51] Int. Cl.$^6$ .................................................. G11B 7/00
[52] U.S. Cl. .................................. 369/60; 369/47
[58] Field of Search ................................ 369/54, 58, 32,
369/48, 44.28, 59, 60, 47

[56] References Cited

U.S. PATENT DOCUMENTS

| | | | |
|---|---|---|---|
| 5,323,367 | 6/1994 | Tamura et al. .......................... | 369/58 |
| 5,430,703 | 7/1995 | Tsuji et al. ............................. | 369/60 |
| 5,444,687 | 8/1995 | Okumura .............................. | 369/60 |
| 5,491,677 | 2/1996 | Sasaki ................................... | 369/60 |

*Primary Examiner*—Nabil Hindi
*Attorney, Agent, or Firm*—Price, Gess & Ubell

[57] ABSTRACT

A playback device is arranged such that an estimated data amount is calculated based on an address in the recording region which is currently being read by the data reading device, and the end address of the data. The data stored in the storage device is audio-output only if the data amount, which is the sum of the calculated estimated data amount and the amount of data stored in the storage device, is more than the amount of data which would be audio-output in a time corresponding to the maximum access time of the recording medium. It is therefore possible to solve the problem of there being no data stored in the storage device and of sound cutting out, no matter which address position the data is currently being read from.

6 Claims, 7 Drawing Sheets

FIG. I
PRIOR ART
(a) 1Tr, 2Tr, 3Tr, 4Tr, 5Tr, 6Tr  RECORD
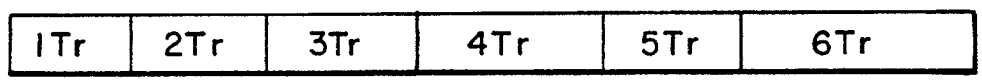
(b) 2Tr, 4Tr, 6Tr  ERASE
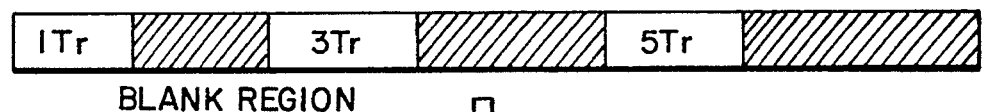
BLANK REGION
(c) RENUMBER
(d) 4Tr RECORD
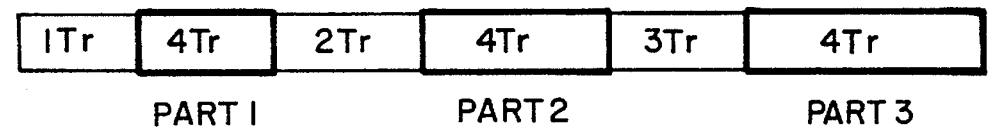
PART 1  PART 2  PART 3

DATA PLAYBACK DEVICE WITH VERIFICATION OF DATA OUTPUT BY CALCULATING DEVICE

BACKGROUND OF THE INVENTION

1. Field of the Invention

The present invention relates to a playback device which plays back a plurality of data which are stored on a recording medium such as an optical disc or optomagnetic disc and, more particularly, to an improved data playback device that ensures a constant uninterrupted output of data to be played.

2. Description of Related Art

In the past, compact disc (referred to simply as CD hereinbelow) players which play back CDs have become widespread as such playback devices.

However, in recent years mini discs (referred to simply as MDs hereinbelow) have also become widespread, and these not only play back recorded data, in the same way as CDs, but also have a recording medium whereby data can be rewritten.

In these MDs, optical discs or optomagnetic discs are housed in protective cassettes. There are two types of MD. These are the premastered type in which optical discs are housed in protective cassettes and which perform playback only, and the recordable type in which an optomagnetic disc is housed in a protective cassette and which are configured such that data can be written onto a recording medium.

With recordable-type MDs, if data are repeatedly recorded and erased, certain tracks on the recording medium will become divided into a plurality of parts. A description will be given, with reference to FIG. 1, of the degree to which a plurality of parts are generated in this way on a single track. This figure is an explanatory diagram showing a state in which a plurality of data recorded on a disc are expressed linearly. It should be noted that, unless otherwise indicated to the contrary, the term "disc" refers to these recordable-type MDs.

As shown in FIG. 1(a), data in track 1 through track 6 are stored on the disc. If the data recorded in tracks 2, 4 and 6 are erased, then, as shown in FIG. 1(b), the regions of tracks 2, 4 and 6 become regions in which data are not recorded, in other words, blank regions (indicated on the diagram by diagonal lines).

The track numbers for the data remaining in tracks 1, 3 and 5 are then altered such that they are each closed up, as shown in FIG. 1(c), with the blank regions remaining unaltered. In other words, the numbers are altered such that track 1 remains the same, track 3 becomes track 2 and track 5 becomes track 3.

If a new track, for example a track 4 which is configured with a relatively large amount of data, is then stored on the disc in the state shown in FIG. 1(c), then the data in said track 4 are stored so as to fill up from the front the blank regions shown in FIG. 1(c), and the data in track 4 which is stored in these blank regions consist of parts 1, 2 and 3, as shown in FIG. 1(d). In other words, the data recorded as the data in track 4 are divided and recorded in a plurality of discontinuous parts. It should be noted that a TOC (Table Of Contents), and a user TOC (User Table Of Contents, referred to simply as "UTOC" hereinbelow) which are identification data recording the start address and end address of each track and each part are stored on the disc.

An MD player is generally used to read out and play back data recorded on an MD. A case will now be assumed in which readout and playback are performed on a disc in a state such as that shown in FIG. 1(d), using an MD player. If, as shown in FIG. 2, an optical pickup 11 begins to read data from a part neighboring the end address of part 1 of the song data in the fourth track, then when the amount of data read from this neighboring part and stored in RAM (Random Access Memory), which is used as a storage device, reaches a specified amount N, playback of the data stored in the RAM begins, in conjunction with the reading and storing of data. At this time, when the end address (2) of the part is reached after data readout has started, the pickup must jump to the start address (3) of part 2. When this jump takes time to occur, there is a problem that data in the RAM 15 may be used up before the jump has been completed and reading of data from the next part has commenced, in other words, there is no data in the RAM, there is thus no data to be played back and no sound is produced for a moment.

SUMMARY OF THE INVENTION

The present invention takes the abovementioned problems into account and aims to provide a playback device which can play back sound continuously, whichever position the data are read from.

For this purpose, according to the present invention, there is provided a data playback device which is provided with a reading means (11 in FIG. 3) which reads data recorded on a recording medium;

a recording means (15 in FIG. 3) which temporarily records data read by the abovementioned reading means;

a calculating means (S15A in FIGS. 7A and B) which calculates the sum of the amount of data (n2) recorded in the abovementioned recording means and the amount of data (n1) in the recording region of the abovementioned recording medium which is to be read;

a first check means (S16 in FIGS. 7A and B) which checks whether or not the value calculated by the abovementioned calculating means is equal to or greater than a specified value;

and a first control means (16/29 in FIG. 3 and S17 in FIGS. 7A and B) which controls the abovementioned recording means such that data recorded in the abovementioned recording means are output only when the abovementioned calculated value is equal to or greater than the abovementioned specified value, as a result of the checking performed by the abovementioned first checking means.

The playback device of the present invention according to this configuration is arranged such that an estimated amount of data is calculated based on the address of the data currently being read by the data reading means and the end address of the data, and the data stored in the storage means are audio-output only if the data capacity, which is the sum of the calculated estimated amount of data and the amount of data stored in the storage means, is more than a specified value, and it is therefore possible to solve the problem of there being no data stored in the storage means and of the sound cutting out, whichever address position the data are currently being read from.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is an explanatory diagram showing the processing of a plurality of data recorded on a disc.

DETAILED DESCRIPTION OF THE PREFERRED EMBODIMENTS

Figure 2:
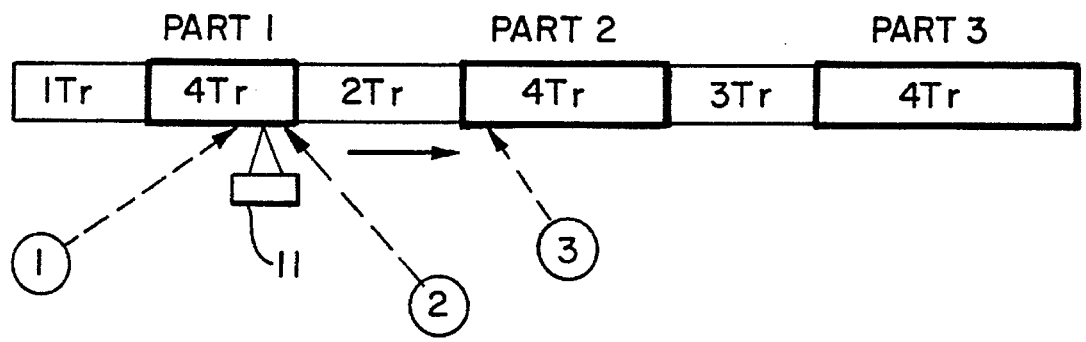
FIG. 2 shows an explanatory diagram which explains the problems involved when accessing data recorded on a disc in a conventional MD player.
Figure 3A:
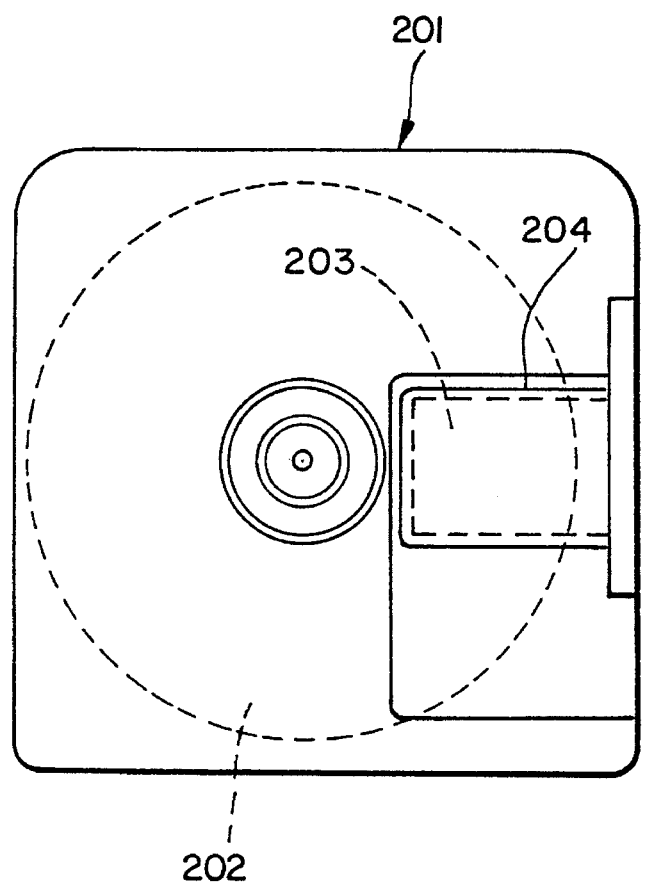
FIG. 3A is a diagram showing an example of an MD which is applicable to the device of the present invention.

The following description is provided to enable any person skilled in the art to make and use the invention, and sets forth the best modes contemplated by the inventor for carrying out his invention. Various modifications, however, will remain readily apparent to those skilled in the art, since the generic principles of the present invention have been defined herein. FIG. 3A is a diagram showing an example of an MD to which the present invention can be applied, where 201 is a cassette case, 202 is a recording medium body which is housed in the cassette case, and 203 is an access aperture provided in the cassette case 201, through which the recording medium body can be accessed. 204 is a shutter which opens and closes the access aperture. The shutter 204 is closed except when the MD is in use, thereby protecting the recording medium body 202.

Figure 3:
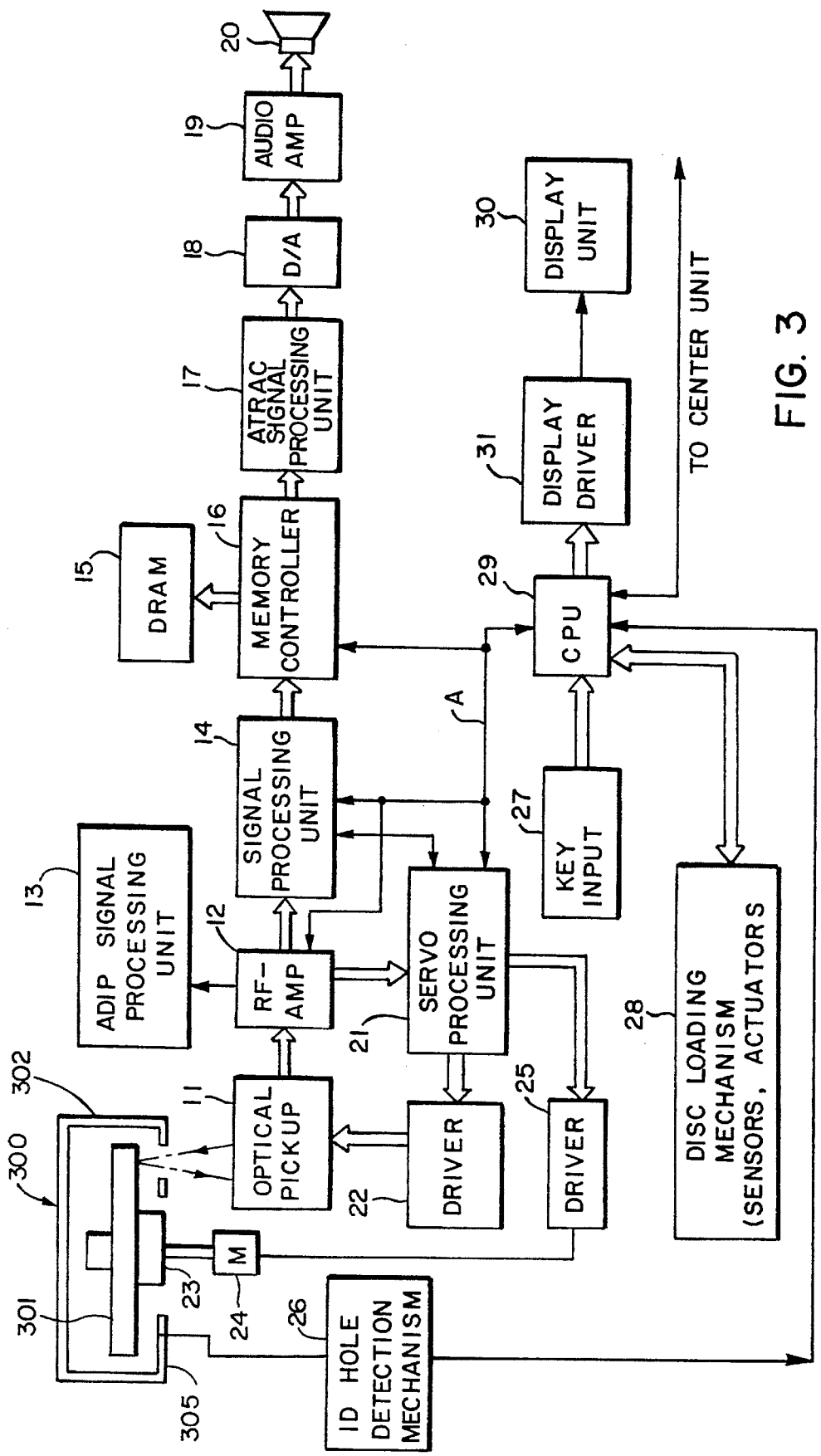
FIG. 3 is a block diagram showing the outline configuration of an MD player.

The MD player of the present invention, shown in FIG. 3, has an audio system, a servo system and a control system. The audio system comprises the following. That is, an optical pickup 11 which reads data recorded on a recording medium 301 in a disc 300, by irradiating a light beam onto the disc surface of the disc 300 and detecting the light beam reflected from the disc surface; an RF (Radio Frequency) amplifier 12 which amplifies the high-frequency signal read by the optical pickup 11; an ADIP (ADdress In Pregroove) signal processing unit 13 which decodes the address signal obtained from the RF amplifier 12; a signal processing unit 14 which converts the read signal obtained from the RF amplifier 12 into digital signal audio data, and which performs specified signal processing; a memory controller 16 which compresses, in the time-access direction, the audio data obtained by the signal processing unit 14 and writes the data in DRAM (Dynamic Random Access Memory) 15, and which controls the DRAM 15 such that the audio data read out from the DRAM 15 are output at a read out rate which is slower than during writing; an ATRAC (Adaptive TRansform Coding) signal processing unit 17 which expands the audio data obtained from the memory controller 16 approximately five times in the time-access direction, and which maintains the audio output in the desired state by performing various corrections on the audio data; and a D/A convertor 18 which converts the digital signal audio data obtained from the ATRAC signal processing unit 17 into an analog signal.

The output from the abovementioned D/A convertor 18 then passes through an audio amplifier 19 which amplifies the analog audio signal, and is connected to a speaker 20 which audio-outputs the amplified analog audio signal.

Further, the abovementioned servo system comprises the following. That is, a servo processing unit 21 which receives signals such as a read synchronization signal and a tracking error signal, obtained by the abovementioned RF amplifier 12, and which generates drive control signals; a driver 22 which generates drive signals which drive, by means of the control signal from the servo processing unit 21, the light beam generating unit in the optical pickup 11, a tracking actuator, a focusing actuator and a sled motor (none of these are shown); and a driver 25 which generates a rotation control signal which, by means of the control signal from the servo processing unit 21, controls the rotational frequency of a spindle motor 24 which rotationally drives the recording medium 301 which is installed on a turntable 23.

Further, the abovementioned control system is provided with an ID hole detection mechanism 26 which detects an ID hole 305 which is provided in the protective cassette 302 of the disc 300; a key input interface 27 which accepts data input from an operating unit, not shown; a disc loading mechanism 28 consisting of an actuator which is associated with the loading action when the disc 300 is installed on the abovementioned turntable 23, and various sensors inside the MD player; a CPU 29 which controls the whole of the MD player and which effects communication with a center unit, not shown, which controls, for example, the functions of a radio tuner or a tape deck which are provided attached to the player, or volume adjustment functions; and a display driver 31 which drives a display unit 30 which displays the state of the device, based on display data output from the CPU 29. It should be noted that the abovementioned CPU 29 has a memory unit, not shown, which stores various data and the like such as the UTOC.

Therefore the MD player is arranged such that data recorded on the abovementioned disc are read by the optical pickup 11, and the read data are stored in the DRAM 15, and data are read out from the abovementioned DRAM 15 at a rate which is one fifth of said reading rate.

Figure 4:
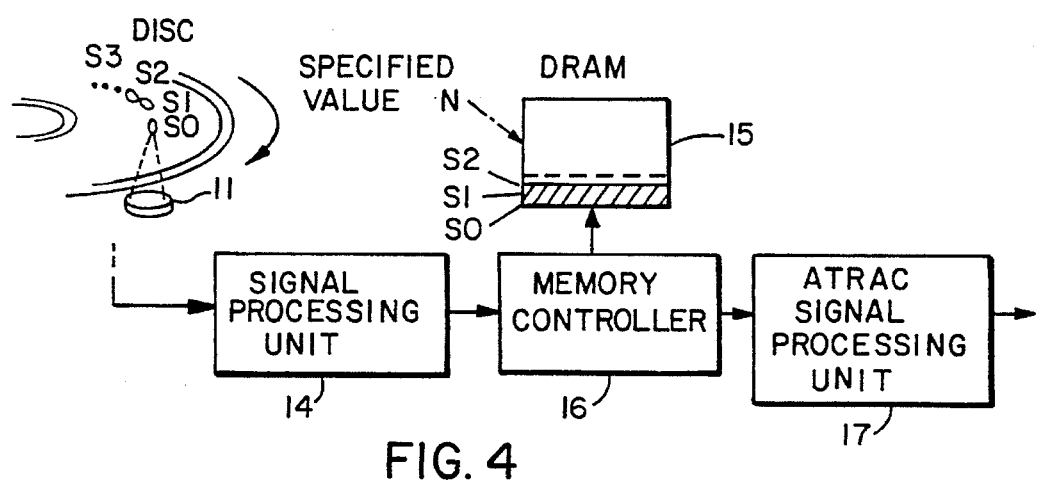
FIG. 4 shows an explanatory diagram explaining the operation of an MD player when the data read process begins.

A description will now be given, based on FIG. 4 through FIG. 6, of the operation when the MD player of the present invention plays back data recorded on a disc on which data are recorded as shown in FIG. 1(d). It should be noted that the data recorded on the disc, for example musical song data, are recorded in a spiral shape, and considering the song data to be a set of sectors of a prescribed size, for convenience the sectors are read in the order S0, S1, S2 . . . . FIG. 4 is an explanatory diagram explaining the operation of the MD player when the data read process begins, FIG. 5 is an explanatory diagram explaining the operation of the MD player of the present invention when the data readout process has begun, and FIG. 6 is a diagram explaining the operation of the MD player of the present invention during the data readout operation.

When playing back data recorded on the disc, the TOC and UTOC which are recorded on the disc are stored in the memory unit in the CPU 29.

In the operation when the data read process begins, the optical pickup 11 of the MD player in FIG. 4 supplies data recorded on the disc to the signal processing unit 14 via the signal RF amplifier 12, for each sector in turn. The signal processing unit 14 sequentially supplies the data supplied in turn from each sector to the DRAM 15 via the memory control 16.

Figure 5:
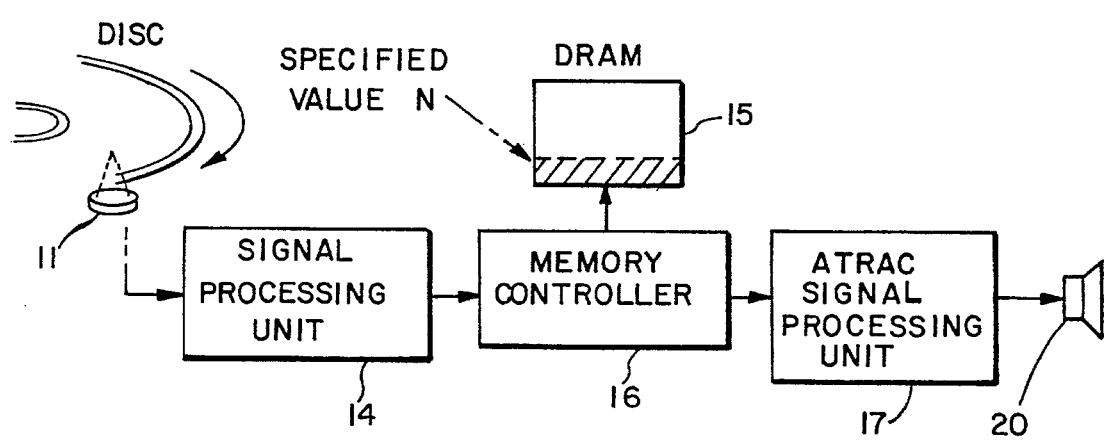
FIG. 5 shows a diagram explaining the operation of an MD player when the data readout process begins.
Figure 6:
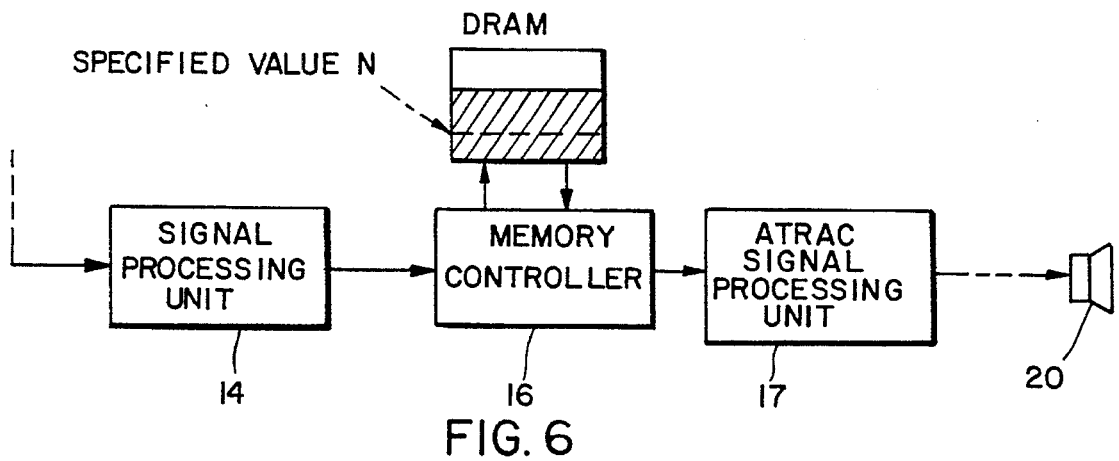
FIG. 6 shows a diagram explaining the operation of an MD player during the data readout process.

In the operation when the data readout process begins, when the amount of data stored in the DRAM 15 reaches the specified capacity "N," the memory controller 16 in FIG. 5 supplies the data stored in the DRAM 15 to the ATRAC signal processing unit 17 in conjunction with the data read process. The ATRAC signal processing unit 17 performs a data expansion process whereby the data are expanded in the time axis by a specified amount, for example 5 times, and outputs the expanded data.

It should be noted that if the abovementioned specified capacity "N" of the DRAM 15 is too large, then a period of time will be required to accumulate data and it will take time for sound to be output. Further, if it is too small then problems such as the following will occur. To elaborate, if for some reason the speed at which data are recorded in the DRAM 15 drops, a situation is liable to occur in which there are no data stored in the DRAM 15 and the audio output cuts out. Therefore the value of "N" is selected within a range permitted by the specifications of the device.

In the operation during the data readout process, as has already been described, the abovementioned memory controller 16 stores data read by the abovementioned optical pickup 11 in the abovementioned DRAM 15 while supplying data stored in the DRAM 15 to the abovementioned ATRAC signal processing unit 17. The ATRAC signal processing unit 17 performs a data expansion process of approximately 5 times on the data stored in the DRAM 15, and audio-outputs the expanded data from a speaker 20.

In other words, the read rate at which read data are stored in the DRAM 15 is approximately 5 times the readout rate at which data stored in the DRAM 15 are read out, and therefore the amount of data recorded in the DRAM 15 gradually increases. Then when the amount of data stored in the DRAM 15 is equal to capacity of the DRAM 15, the data read operation of the optical pickup 11 enters a pause state, and waits until there is space in the memory capacity of the DRAM 15.

Therefore the MD player is configured such that data recorded on the disc are read and stored in the DRAM 15 whilst the stored data are output at a rate which is 5 times slower than the read rate, and it is therefore possible to reduce the possibility of there being no data stored in the DRAM 15 and to prevent as far as possible the sound from cutting out due to a lack of data to be output.

Further, in the MD player of the present invention, the maximum access time of the disc 300, in other words, the time required for the pickup to move between the innermost edge to the outermost edge of the data region in the disc 300, is converted into a data amount based on the audio output rate, and this converted data amount is recorded in advance as the minimum data amount ("n0") in a ROM (Read Only Memory), not shown, or a memory unit, not shown, in the CPU 29. In other words, if the amount of data stored in the DRAM 15 is equal to or greater than the minimum data amount then it is possible to prevent the sound from cutting out even with the largest movement of the pickup. Further, in the MD player of the present invention, an estimated data amount n1 is calculated based on the address from which data are currently being read by the optical pickup 11, and the end address of that part, and arrangements are made such that the data stored in the DRAM 15 are only audio-output from the speaker 20 if the sum of the calculated estimated data amount n1 and the capacity n2 of data stored in the DRAM 15, in other words, "n1+n2" is more than the abovementioned minimum data amount "n0."

The abovementioned estimated data amount n1 is the difference between the address which is currently being read and the end address of the part in which the read operation is being performed. In other words, it is the amount of data which can be read continuously from the current point in time.

Further, the abovementioned maximum access time is the time required for the abovementioned optical pickup 11 to move between the outermost edge and the innermost edge of the recording region of the recording medium 301. If the maximum access time is, for example, 2[sec] then the sound will not cut out when the optical pickup 11 passes the end address of any part, provided that 2[sec] of audio data, at the audio output rate, and an amount of data "a" corresponding to a certain margin are stored in the abovementioned DRAM 15. Further, the abovementioned specified capacity "N" associated with the start of data output from the DRAM 15 is 10 sectors. Furthermore, the amount of data corresponding to the abovementioned margin can be set at, for example, 2 sectors' worth of data.

Here, if the time required to read out one sector of data which has been expanded by the abovementioned ATRAC signal processing unit 17 is 64[msec], then the number of sectors corresponding to the audio data for 2[sec], which is the abovementioned maximum access time, will be 2000 [msec]/64[msec]=32[sectors].

In other words, the abovementioned minimum data amount n0 is 34 sectors, which is the sum of the abovementioned 32 sectors and the margin of 2 sectors.

Figure 8:
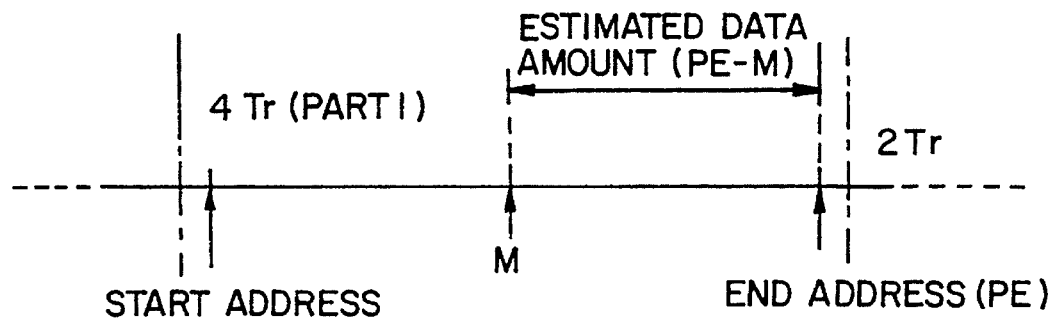
FIG. 8 is an explanatory diagram showing the state of movement of the optical pickup during the data readout process in an MD player in which the present invention has been applied.
Figure 9:
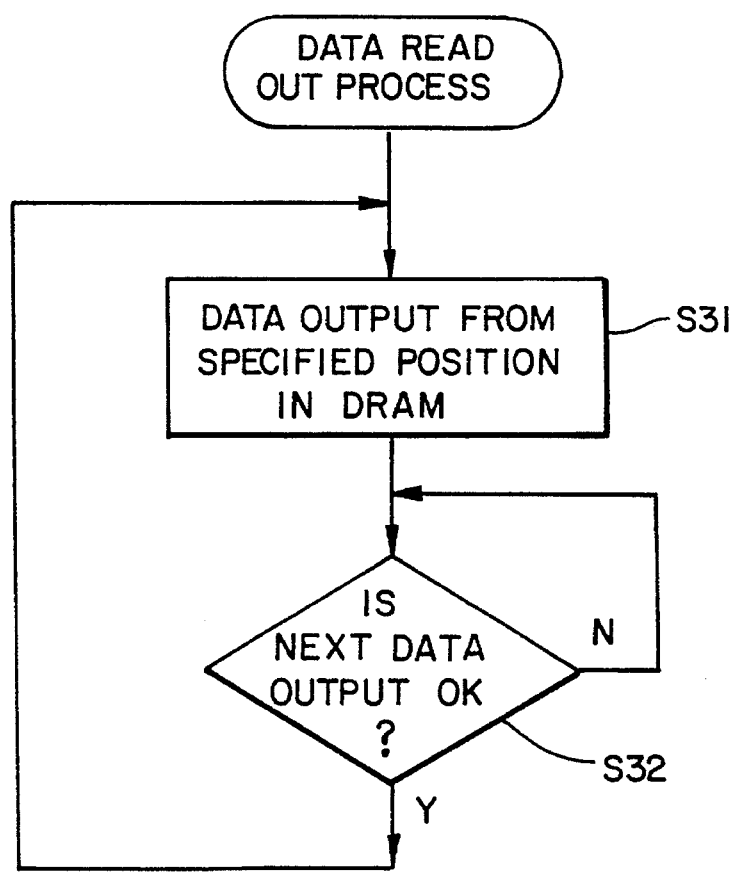
FIG. 9 is a flow chart showing the processing operation of the memory controller during the data readout process in an MD player in which the present invention has been applied.

A description will now be given relating to the operation of the MD player of the present invention. FIG. 7 is a flow chart showing the processing operations of the memory controller 16 and CPU 29 when the MD player of the present invention is performing a data read process. FIG. 8 is an explanatory diagram which shows diagrammatically the state of movement of the optical pickup 11 during the data read process. FIG. 9 is a flow chart showing the processing operation of the microcontroller 16 during the data readout operation.

Figure 7A:
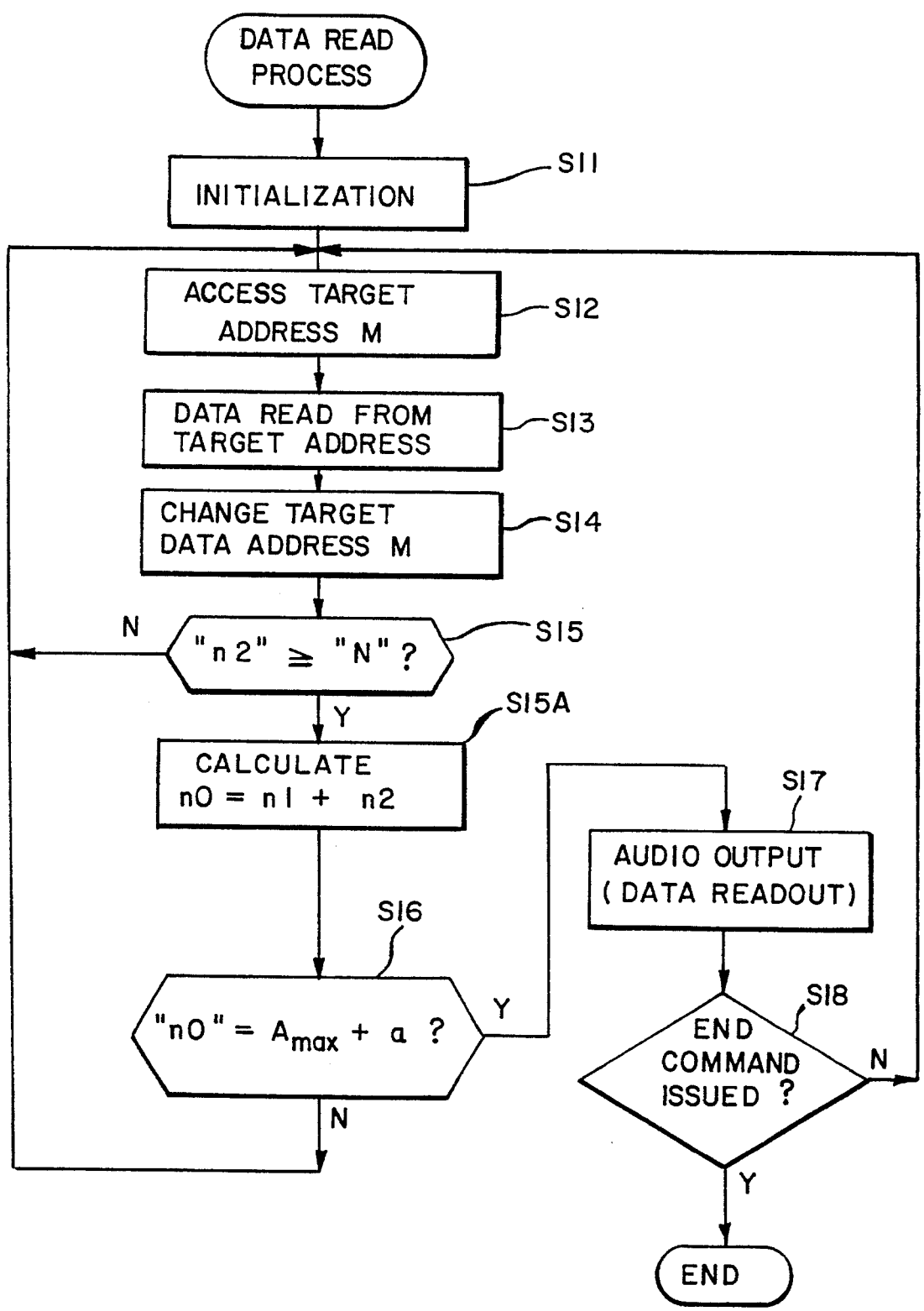
FIG. 7A is a flow chart showing the processing operation in the memory controller and CPU during the data read process in an MD player in which the playback device of the present invention has been applied.
Figure 7B:
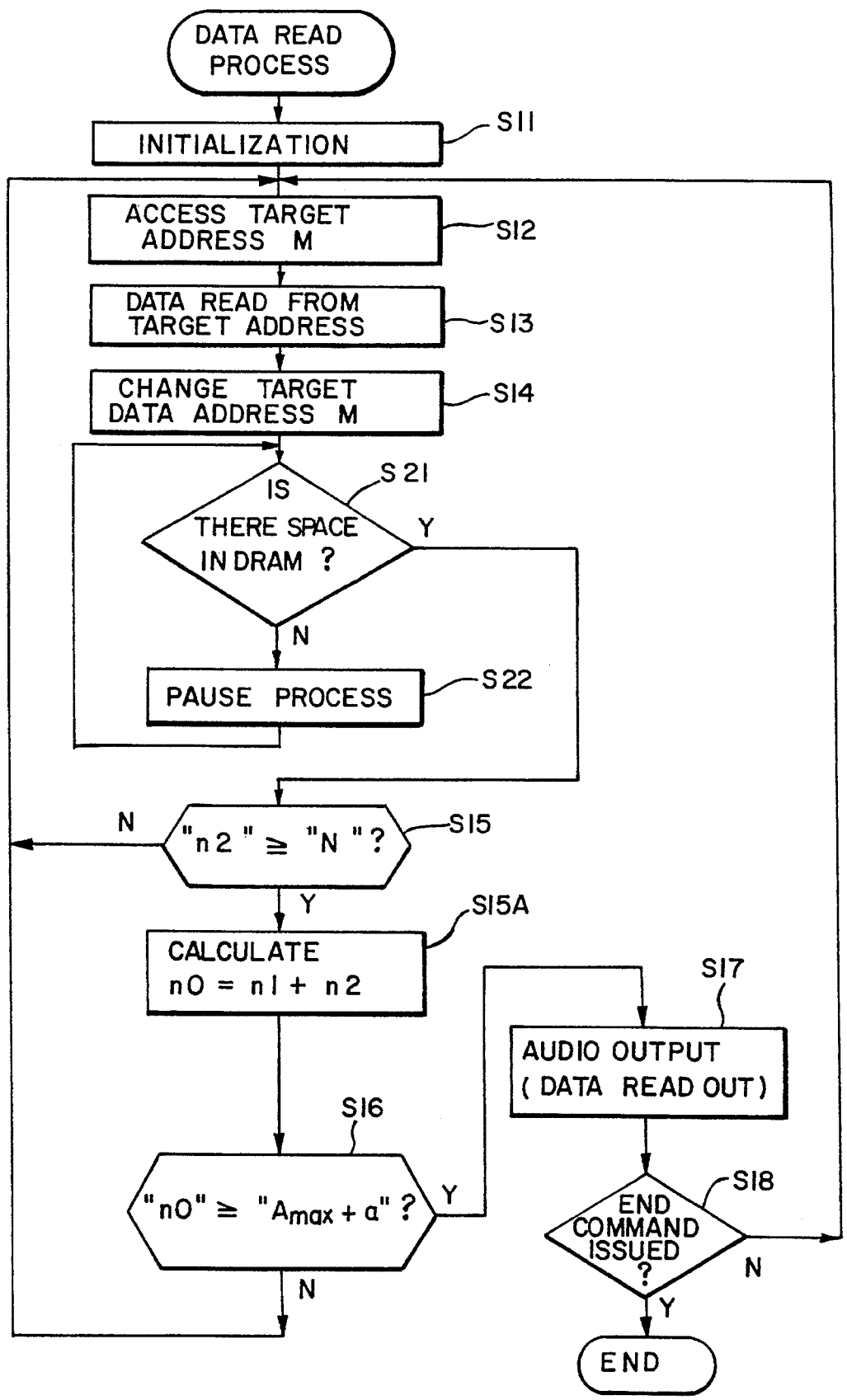
FIG. 7B is a flow chart showing an improved example of the control performed in the flow chart shown in FIG. 7A.

In step S11 in FIG. 7A, the memory controller 16 performs an initialization in which it clears the data in the DRAM 15 and temporarily inhibits the readout operation of data from the DRAM 15.

In step S12, the CPU 29 sets the optical pickup 11 to the target address "M" for which a playback command has been received, and begins accessing data recorded at the target address, and in step S13 the memory controller 16 controls the DRAM 15 such that it records the data at the target address which has been read. Further, in step S14, "M" is renewed to the next target address, and in step S15 a judgement is made to determine whether or not the amount "n2" of data recorded in the DRAM 15 at this moment has reached the specified capacity "N."

If the amount "n2" of data recorded in the DRAM 15 has reached the specified capacity "N," then an estimated data amount "n1" is calculated as "n1=PE−M" by subtracting the address M which is currently being read, from the end address PE of the part in which data are currently being read, for example part 1 of 4Tr in the example shown in FIG. 8, based on the UTOC stored in the memory unit in the CPU 29. In step S15A, the data amount "n1+n2"="(PE−M)+n2" is calculated as the sum of the calculated estimated data amount "n1" and the amount "n2" of data currently recorded in the DRAM 15. In step S16 a judgement is made to determine whether or not the calculated data amount is equal to or greater than the abovementioned minimum data amount "n0"=$A_{max}$+a =34 sectors, in other words, whether or not "n0"="n1+n2"≧$A_{max}$+a. Here, $A_{max}$, is the data amount corresponding to the abovementioned maximum access time.

If the calculated data amount "n0" is greater than or equal to the abovementioned minimum data amount "n0"=($A_{max}$+a), then in step S17 the memory controller 16 reads out the data recorded in the DRAM 15, performs an expansion process on the readout data in the abovementioned ATRAC signal processing unit 17, and outputs the data as audio data. Then, based on a command from the CPU 29, the optical pickup 11 is moved to the address from which data are to be read out, and the readout of data and its output as audio data continue.

Further, if the abovementioned calculated data amount "n0" is less than the minimum data amount $A_{max}$+a, in other words, if the process has entered the "NO" routine in step S16, then the same processing operations as in steps S12, 13 and 14 are executed without data being read out from the DRAM 15, and after data have been recorded in the DRAM 15 the process moves to step S16. After the data have been output in step S17, a check is always performed in step S18 to determine whether or not the CPU 29 has issued an end command, in other words, a playback end command, and if the result is "YES" then the sequence of processes ends.

As outlined above, when such a process is performed, the speed at which data are recorded in the DRAM 15 is approximately 5 times the speed at which data are output, and therefore the amount of data recorded in the DRAM 15 increases. Thus, as shown in the flow chart in FIG. 7B, it is also possible to have a configuration such that a check is made in step S21 to determine whether or not there is space in the recording region of the DRAM 15, and if there is not space then in step S22 the data read operation of the optical pickup 11 is temporarily halted.

With reference to FIG. 9, a description will now be given of the processing operation when data recorded in the DRAM 15 are read out in step S17. It should be noted that as outlined above, the data readout process is executed at the same time as the abovementioned data read process.

In step S31 in FIG. 9, data are output from the DRAM 15 in a specified order, under the control of the memory controller 16, and the output data are supplied to the abovementioned ATRAC signal processing unit 17. Furthermore, in step S32 a judgement is made to determine whether or not it is possible to output the next data in the abovementioned specified order from the DRAM 15.

If it is possible to output the next data in the specified order from the DRAM 15, in other words, if the decision in step S32 is "YES," then the process moves to step S31, and if it is "NO," then the process moves to step S32 and waits for data output.

According to the abovementioned embodiment, it is possible to solve the problem of the sound cutting out as a result of there being no data in the DRAM 15.

It should be noted that in the abovementioned embodiment as shown in FIG. 7A, after initialization has been performed in step S11 the process moves to step S16 after the affirmative decision process in the process of step S15 in which a decision is made to determine whether or not the amount "n2" of data in the DRAM 15 has reached the specified "N," but it is also possible for the process to move to the processing operation of step S16 after the processing operation of step S11, even if the amount "n2" of data in the DRAM 15 has not reached the specified capacity "N." Further, in the abovementioned embodiment, the preparations for audio output to begin depend on the maximum access time of the disc 300, as is clear from the portion comprising steps S16 and S17. However, the maximum access time is determined by the configuration of the disc and the speed of movement of the optical pickup, and is not related to how the data which are to be read out are divided and recorded on the disc. It is therefore also possible to determine and set in advance specified times other than the maximum access time. It is further possible to arrange that these times can be input externally at will.

Further, in the abovementioned embodiment, a recordable-type disc was taken as the object of the description, but a premastered-type disc may also be taken as the object. However, when a premastered-type disc is taken as the object, the tracks recorded on the premastered-type disc are not divided into a plurality of parts and recorded, and thus during normal playback the processing operation in step S16 shown in FIGS. 7A and B may be omitted, and audio data may be output when the amount of data in the DRAM 15 reaches the specified capacity, and the advantages can be further enhanced if the processing operation of the present invention as shown in FIGS. 7A and B is executed only during special playback, for example during scanning playback in which only the beginning of each track is performed, random playback in which the tracks recorded on the disc are performed continuously in random order, or program playback in which the tracks recorded on the disc are continuously performed successively in a desired order.

Further, in the abovementioned embodiment a disc on which audio data are recorded was taken as the object of the description, but the object need not be a disc on which only audio data are recorded, but may be one on which video data or the like are recorded.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A data playback device comprising:

a recording medium;

a reading means that is provided with an optical pick-up for reading data recorded on said recording medium;

a temporary storing means for temporarily storing data read by said reading means;

a calculating means for calculating a value representing a sum of an amount of data (n2) stored in said temporary storing means and an amount of data (n1) on said recording medium remaining to be read;

a first check means for checking whether or not the sum calculated by said calculating means is equal to or greater than a predetermined specified value; and a first control means for controlling said temporary storing means to output only when the calculated sum from said calculating means is equal to or greater than the predetermined specified value that is proportional to the time required for the optical pickup to move between the innermost edge to the outermost edge on said recording medium.

2. The data playback device as claimed in claim 1, wherein the predetermined specified value is associated with the amount of data which is read out, at the rate at which data is read out from the recording means, during the time of movement of the optical pickup device.

3. The device as claimed in claim 1 wherein an additional value is further added to said predetermined specified value as a margin of safety.

4. The data playback device as claimed in claim 1, further comprising:
   a second check means for checking whether or not the value (n2) representing the amount of data stored in said temporary storing means is larger than another predetermined specified value (N), and wherein said first check means operates only when said second check means determines that the value (n2) is greater than the value (N).

5. The data playback device as claimed in claim 4, further comprising:
   a third check means for checking whether or not there is space in said temporary storing means to store additional data; and
   a data read control means for controlling said data read means to operate only when said third check means determines that there is space.

6. The data playback device comprising:
   a second control means that controls the first check means if the second check means determines that the value (n2) of the amount of data recorded in said temporary storing means is greater than another predetermined specified value (N); and
   a first control means that controls said recording means such that data stored in said temporary storing means is output only when said calculated value is equal to or greater than said predetermined specified value (N), as a result of the checking performed by said first checking means.

* * * * *